United States Patent [19]
Schöpf et al.

[11] 3,984,188
[45] Oct. 5, 1976

[54] OPTICAL ISOCHROMATIC MULTIPLIER EXAMINATION APPARATUS

[75] Inventors: Hans-Joachim Schöpf, Stuttgart; Helmut Maisch, Kongen, both of Germany

[73] Assignee: Daimler-Benz Aktiengesellschaft, Stuttgart, Germany

[22] Filed: Jan. 20, 1975

[21] Appl. No.: 542,304

[30] Foreign Application Priority Data
Jan. 24, 1974 Germany............................ 2403253

[52] U.S. Cl.................................. 356/33; 73/88 A; 356/107; 356/244
[51] Int. Cl.²......................................... G01B 11/18
[58] Field of Search .............................. 356/32–35, 356/244, 256, 107; 73/88 A

[56] References Cited
UNITED STATES PATENTS

| | | | |
|---|---|---|---|
| 2,656,757 | 10/1953 | Stern................................... | 356/244 |
| 3,243,819 | 3/1966 | Chapman............................ | 73/88 A |
| 3,293,908 | 12/1966 | Chapman............................ | 73/88 A |
| 3,758,217 | 9/1973 | Stokstad ............................. | 356/256 |

OTHER PUBLICATIONS
An Interference–Polarization . . . Models; Nagibina et al. Soviet J. Opt Technol; vol. 36 No. 6;11–12/69; pp. 825–828.

*Primary Examiner*—Vincent P. McGraw
*Attorney, Agent, or Firm*—Craig & Antonelli

[57] ABSTRACT

An optical examining apparatus, particularly an isochromatic multiplier, with two optical elements, particularly partly light-transmitting mirrors arranged at a distance and at a definite angle to one another which enclose an object-receiving space, whereby the object is to be inserted between the two mirrors at a definite distance and/or in a defined angular position; an object carrier is thereby mounted at the edge or enclosure of at least one of the optical elements, which is provided with receiving and holding surfaces and fastening means for the object and which is adjustable in the angular position of the receiving and holding surfaces with respect to the plane of one and/or the other optical element; the object carrier thereby projects with its receiving surfaces and fastening means between the two optical elements.

28 Claims, 4 Drawing Figures

OPTICAL ISOCHROMATIC MULTIPLIER EXAMINATION APPARATUS

The present invention relates to an optical examining apparatus, especially to an isochromatic multiplier, with two optical elements arranged at a distance and at a defined angle to one another and enclosing therebetween an object-receiving space, especially with partially light-transmitting mirrors, between which is to be mounted the essentially plane and flat object at a defined distance and/or in a defined angular position.

Isochromatic multipliers are photoelastic examining apparatus for strength analysis of loaded or stressed structural parts by means of light-transmitting models. These apparatus operate according to the transillumination method; a light beam of polarized light is thereby transmitted several times at a different angle through a flat, light-transmitting test piece or specimen having a "frozen-in" stress condition. Lines of identical main stress difference then become visible as lines of identical color, as so-called isochromates. By reason of the multiple transillumination with a slightly varied transillumination angle, the isochromates appear in relatively dense sequence. A frozen-in stress condition of a specimen or test piece is obtained in that one statically loads and stresses the specimen or model of light-transmitting material of certain optical properties in a condition heated to a predetermined temperature and permits the same to cool off slowly in the loaded or stressed condition. This method is applied principally in connection with three-dimensional stress conditions. Narrow disk-shaped specimens can be sawed off in a desired direction from three-dimensional photo-elastic models with a frozen-in stress condition, can be finished superficially and can be examined photoelastically. It is necessary for producing an isochromatic image with a high ordinal number, to install the disk-shaped specimen between two semi-translucent or semi-transparent mirrors of small distance and slight mutual angular inclination, whereby the intermediate space between the mirror surfaces and the specimen has to be filled out with a medium of the same optical index of refraction as that of the specimen material. Heretofore, only a yellowish-colored liquid with a larger specific weight than that of the specimen material is known for this medium, which is chemically and physically compatible with the specimen and the apparatus. The liquid depth in the direction of the light beam, i.e., the mirror spacing must be as small as possible in order that the intensity of the light is not unnecessarily weakened. The expensive partially transparent or partly translucent mirrors necessary for the multiple reflection of the light beam are provided with a relatively soft, optically effective layer or coating on the side thereof on the inside of the bath which can be easily scratched by the installed specimens as a result of lack of attention during the installation and alignment of the specimens.

The plane disk-shaped specimen must be installed into the specific heavier bath between the partially light-transmitting mirrors and has to be completely immersed, and has to be aligned as accurately as possible between the mirrors in the immersed condition. This, however, was possible heretofore only to an incomplete extent and by time-consuming operations since the flat specimen can be manipulated and directed only very poorly into proper position in the spatially constricted conditions between the mirrors. Above all, the bath buoyancy also becomes effective in an interfering manner. In the end result, one had to accept for the most part a tilted or canted position of the specimen, in which the specimen contacted with its edge one or possibly even both mirrors. Such a position made impossible an evaluation of the isochromatic image within the area of contact of the specimen with the mirror. The mirror contacts also scratched the coating thereof and rendered the same un-usable in due course. An excessively inclined position of the specimen with respect to the optical axis of the system also caused the specimen edges to appear too pronouncedly in the isochromatic image and rendered impossible an evaluation of the isochromatic image within the edge area of the specimen. However, a reliable knowledge of the stress conditions in the edge area of the specimen is particularly important.

It is the aim of the present invention to eliminate the inadequacies of the prior art examining method. The underlying problems are solved according to the present invention in that with the examining apparatus of the aforementioned type, an object support or carrier provided at least indirectly with receiving and holding surfaces and fastening means for the object or the specimen to be examined and adjustable in the angular position of the receiving surfaces with respect to the plane of the one or of the other optical element is mounted at the edge or at a frame-like enclosure of at least one of the optical elements, for example, of a partly light-transmitting mirror, which extends with its receiving and holding surfaces and with its fastening means between the optical elements.

Owing to such an object support or carrier, the specimen can be installed with relatively slight time expenditure into a predetermined contact-free intended position between the two optical elements, which can be disturbed neither by vibrations nor by the buoyancy of the liquid of the bath. A scratching danger of the optical elements during the introduction of the specimen and during the examination is far-reachingly precluded thanks to the exact insertability and mounting of the specimen. By reason of the good intended position of the specimen, good and completely evaluable isochromatic images can be realized.

Frequently, with such examining apparatus as, for example, with the isochromatic multipliers, the optical elements are provided with a mutual angular adjustability about a pivot axis and/or with a mutual spacing adjustability. In order not to lose the adjustment of the object support or carrier in such apparatus with an adjustment of the optical elements, it is appropriate if a distance- and angle-bisecting transmission is arranged between the object support or carrier and the edge or frame of the optical elements which centers the receiving and support surfaces of the object support or carrier with respect to distance and angular position between the planes of the optical elements. A large number of constructive possibilities exist for realizing such a distance- and angle-bisecting transmission which bisects the angle and divides the distance into two equal halves. One possibility consists, for example, to clamp the object support to be constructed essentially plane between several pairs of elastic springs which are arranged mutually opposite at the frames of the optical elements and act mutually opposite. Advantageously, the distance-and angle-bisecting transmission is constructed as a kinematic plane six-joint transmission mechanism symmetrical with respect to two mutually perpendicular axes disposed in the plane of operation of the transmission, when in its center position with respect to the arrangement and the effective length of the transmission members and of the joint places thereof, whereby the axes of two mutually opposite pairs of two joint places each which are disposed adjacent to a straight line parallel to the plane of the lines of symmetry are fastened at the same distance parallel to the plane of one of the two optical elements and to the pivot axis thereof, and the object support or carrier is constructed as a shear coupler which connects the two transmission joints disposed between the optical elements, is pivotally connected at one joint and at the other joint and is displaceable in the direction of the two joints whereby the receiving surface of the object support extends parallel to the plane of symmetry defined by the pivot axes of the two transmission joints directly carrying the object support or carrier.

In order to enable the specimen exchange with even less time expenditure and with the same alignment accuracy, it is appropriate to make the object support or carrier of two rapidly disengageable parts fastened to one another and adapted to be rapidly assembled and installed into a definite mutual angular position, whose one part represents the shear-coupler, properly speaking, and whose other part represents an object-holding tool in the form of nippers, pliers or the like. The specimen is then inserted into the disassembled object holding tool and is then manually introduced by means of the holding tool between the optical elements, and thereupon the holding tool together with the specimen are secured at the shear-coupler. In order to enable a particularly rapid disengagement and fastening of the holding tool at the shear coupler, yet also in order to enable a parallel displacement of the specimen in the plane of the intended position of the specimen or test piece within the specimen-receiving space, the fastening means between the shear-coupler, properly speaking, and the object holding tool may advantageously be a holding magnet and a corresponding ferromagnetic counter surface.

In order that, on the one hand, the object holding tool is able to grip the specimen safely and in order that, on the other hand, it is as flat as possible so as to be able to project into the narrow specimen-receiving space, the holding tool consists appropriately essentially of a flat sheet-metal member with a spring-elastic, closed plier mouth extending parallel to the plane of the sheet-metal member. One clamping jaw of the plier mouth (movable jaw) thereby preferably consists of a spring elastic material, especially of a spring steel, secured at the sheet metal member forming the plier handle and the clamping jaw surface (immovable jaw). The plier-like holding tool then becomes clip-like or tweezer-like. The flat construction of the plier body favors a wide movement possibility on the magnet clamping means of the holding tool so that the specimen can be displaced within wide limits in the path of the beam of the examining apparatus. This goal is also served if the sheet metal member forming the plier handle and the immovable clamping jaw consists of ferromagnetic material and if the retaining magnet is arranged at the shear coupler, properly speaking. In order to enable both a displacement as well as a pivoting of the object holding tool in the plane of the intended position of the specimen within as wide limits as possible, it is of advantage if the surface of the retaining magnet and the counter surface are constructed planar and parallel to at least one clamping surface of the plier mouth. Sometimes particularly large specimens have to be installed into the beam path. In order to be able to reliably fasten the object holding tool at the shear coupler also in a particular far-retracted position, the plane magnet countersurface at the object holding tool may extend appropriately without obstacle over the entire length of the pliers from the plier handle to the mouth tip.

In order to assure an accurate center position precisely of the specimen between the optical elements, provision is made that the plane surface of the retaining magnet has a spacing $a$ from the plane defined by the axes of the transmission joints carrying the shear coupler, properly speaking (symmetry plane), which corresponds to half the object thickness plus the distance $s$ of the plier-mouth clamping-surface to the magnet countersurface.

Accordingly, it is an object of the present invention to provide an optical examining apparatus of the type described above which eliminates by simple means the aforementioned shortcomings and drawbacks encountered in the prior art.

Another object of the present invention resides in an optical examining apparatus, particularly an isochromatic multiplier, which ensures improved results, particularly with respect to the possibility of evaluating the entire image obtained thereby.

A further object of the present invention resides in an isochromatic examining apparatus which not only excels by a longer length of life but also enables correct installation and alignment of the specimens without danger of scratching sensitive optical elements.

Still a further object of the present invention resides in an isochromatic multiplier apparatus which permits an accurate alignment of the specimen between the partially light-transmitting mirrors within a relatively short time and without deleterious buoyancy influences by the liquid in the bath.

Still another object of the present invention resides in an isochromatic multiplier of the type described above in which an evaluation of the entire isochromatic image of the specimen is made possible, particularly also within the edge of the specimen.

Still a further object of the present invention resides in an examining apparatus of the type described above in which the specimen can be inserted into its intended position within a relatively short period of time both with accuracy and with the assurance of absence of contact with any of the optical elements.

These and further objects, features and advantages of the present invention will become more apparent from the following description when taken in connection with the accompanying drawing which shows, for purposes of illustration only, one embodiment in accordance with the present invention, and wherein.

Figure 1:
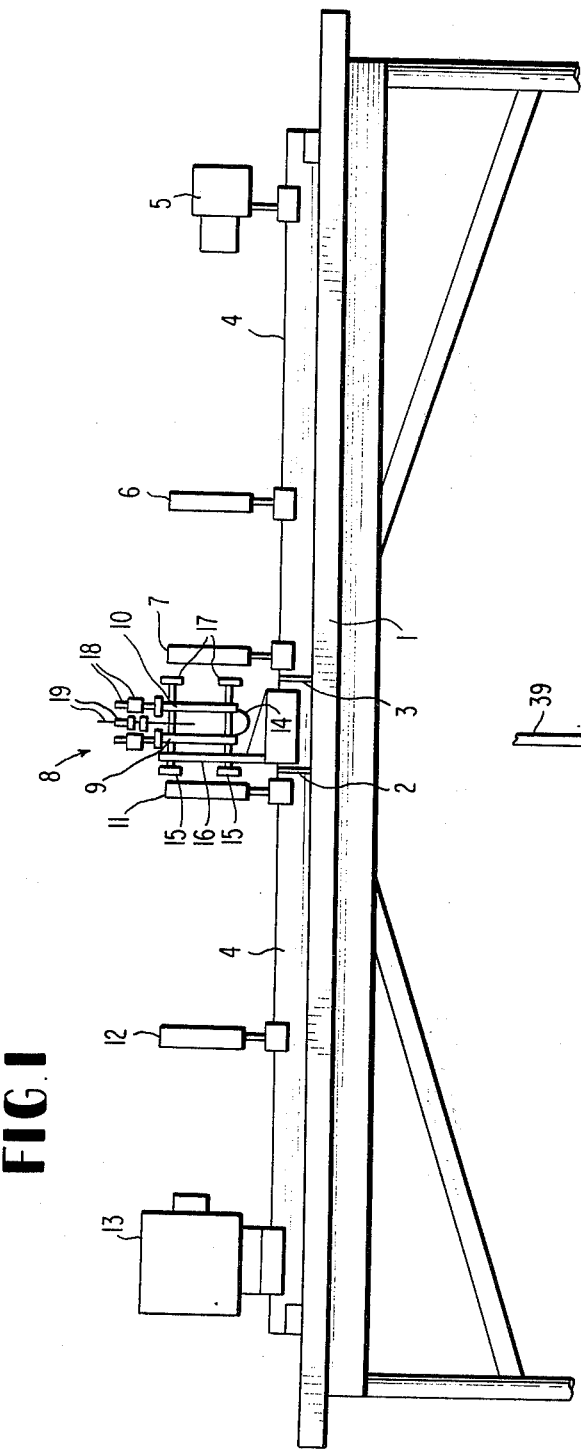
FIG. 1 is a schematic transverse elevational view of an isochromatic multiplier installation in accordance with the present invention.
Figure 2:
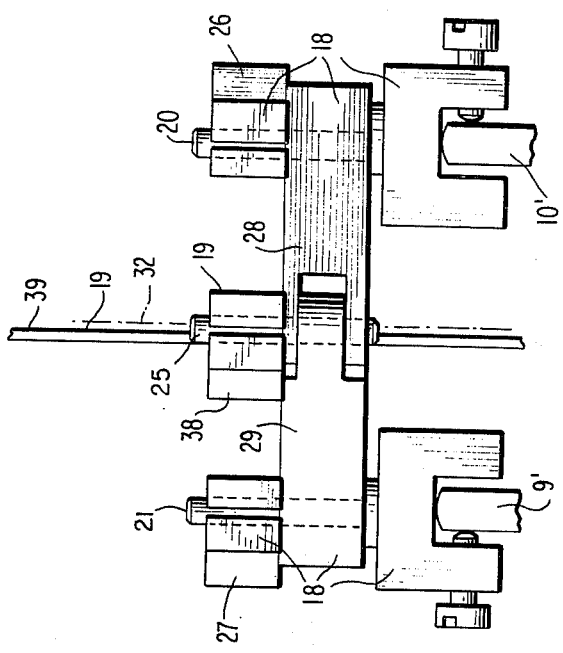
FIG. 2 is a partial elevational view, on an enlarged scale, illustrating the edge of the mirror trough and of the installed distance- and angle-bisecting transmission as well as the object holder in accordance with the present invention, viewed in the same direction as in FIG. 1.

Referring now the drawing, wherein like reference numerals are used throughout the various views to designate like parts, the isochromatic multiplying installation illustrated in FIG. 1 consists of different optical elements and aggregates mounted on a slide rail which is pivotal at two places 2 and 3 and supported by a table 1, namely of a light source 5, of a first polarizing filter 6, of a lens or lens system 7, and of the system generally designated by reference numeral 8 of the two partially light-transmitting mirrors 9 and 10 which encloses the object-receiving space. Furthermore, the installation consists of the further lens system 11, of the second polarizing filter 12 and of the camera 13. The frames or frame-like enclosures 9' and 10' of the two partly light-transmitting mirrors 9 and 10 are connected with each other fluid-tight but movably by means of a strip-shaped rubber membrane or diaphragm 14 along three-quarters of the circumference so that the two mirrors 9 and 10 together with their borders or enclosures 9' and 10' (FIG. 2 or 3) and together with the rubber diaphragm or membrane 14 form a narrow trough open in the upward direction. This trough is filled with fluid of the same optical index of refraction as that of the specimens or test pieces to be examined. The border or frame-like enclosure 9' of the one mirror 9 is supported at the bracket 16 by way of adjusting spindles 15 whereas, in contradistinction thereto, the border or frame-like enclosure 10' of the other mirror 10 is directly supported at the bracket 16 by way of the one mirror 9 by way of adjusting spindles 17. Owing to this arrangement, the mutual spacing of the mirrors 9 and 10 and the mutual inclination — as viewed in plan view of the installation — can be suitably adjusted within reasonable limits; in addition thereto, also the inclinations of the mirrors or of the trough can be adjusted with respect to the optical axis of the system. The buckling or pivot places 2 and 3 are provided in order to be able to incline the light beam incident into the trough or the light beam leaving the trough with respect to the trough.

The space- and angle-bisecting transmission 18 (FIGS. 1-3) is mounted on the trough edge and the object support or carrier 19 is mounted on the transmission 18 (FIGS. 2 and 3); the object support or carrier 19 is thereby retained and guided by the transmission 18 with respect to its clamping surface in the center between the mirrors 9 and 10. The transmission 18 is constructed as a kinematic plane six-joint linkage transmission whose joint points 20 to 25 (FIG. 3) and whose transmission members 26 to 31 determining the joint spacings are arranged and constructed symmetrically with respect to two mutually perpendicularly arranged symmetry axes 32 and 33 whereby the one symmetry axis 32 extends through two joint points and simultaneously determines the distance- and angle-bisecting plane of the transmission 18. The four joint pins 20 to 23 are mounted respectively at a smalll screw clamp 34 to 37, by means of which the pins can be clamped — mutually perpendicular and opposite one another — at the trough edge and at the mirror enclosure 9' and 10'. The pairwise parallel alignment of the pins and their maintenance of mutual spacing is determined by the two transmission members 26 and 27 which, for better accessibility of the trough, are cranked out from above in their center portion out of the straight connection of the joints. One further joint pin 25 and 24 each, of the joint hexagon is centrally guided between the joint pin pairs 20, 21, and 22, 23 by the two coupler pairs 28, 29 and 30, 31 respectively of individual couplets of identical length, which connect respectively two mutually opposite joint pins and bridge the trough. These pins 25 and 24 are always accurately guided in the center between the two pins fixed at the edge of the respectively associated pin pair by reason of the identical position of the coupler members and of the perpendicular juxtaposition of the joint points fixed at the edge — as already indicated — and the centers of these two pins 24 and 25 therefore determine the plane 32' of the transmission which halves the distance and bisects the angle. For this reason, these two symmetry pins 24 and 25 form the receiving and holding surface of the space and angle-bisecting transmission 18 for the object support or carrier 19.

The object support or carrier 19 consists essentially of two parts, namely, of the shear or sliding coupler 38 guided by the two pins 24 and 25 which is cranked out of this plane in its center part for exposing the plane of symmetry 32' and of the plier-like object holding tool generally designated by reference numeral 39 which in its turn is secured at the shear coupler 38. The shear coupler 38 is rotatably supported at the pin 25; it is provided at its other end with an elongated guide aperture 40 disposed symmetrically to the symmetry plane 32', by means of which the shear coupler 38 is longitudinally displaceably and rotatably supported at the other pin 24. A retaining magnet 14 is secured in the center of the shear coupler 38, whose magnetic retaining surface is aligned accurately parallel to the plane of symmetry 32' and has a slight distance $a$ with respect thereto. It serves for the rapid and safe clamping fast, also defined as regards the position, of the object holding tool 39 of ferromagnetic material.

Figure 3:
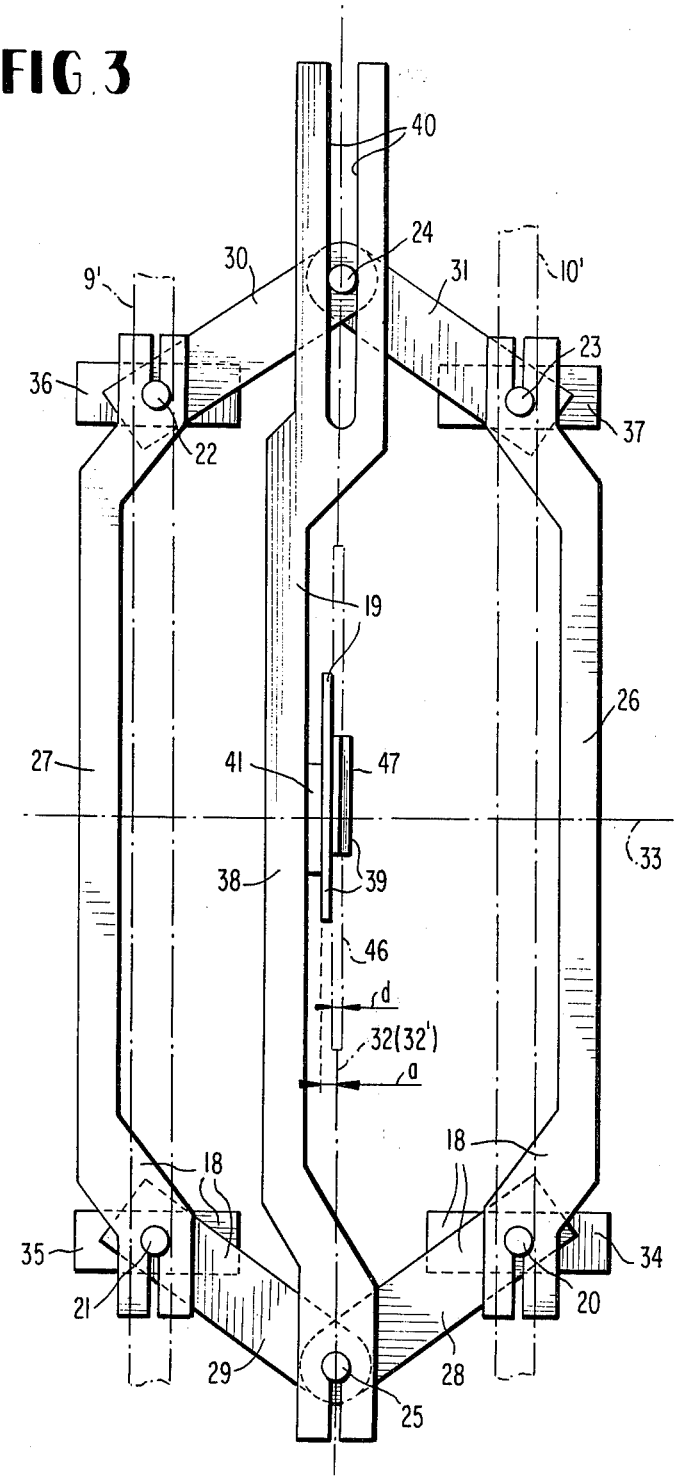
FIG. 3 is a plan view on the distance- and angle-bisecting transmission and object holder in accordance with the present invention.
Figure 4:
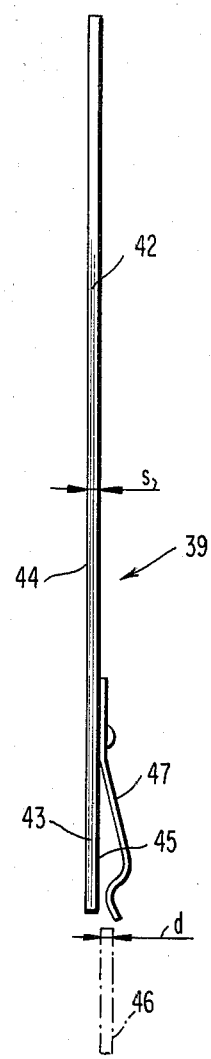
FIG. 4 is a side elevational view of the plier-like object holding tool in accordance with the present invention.

The plier-like object holding tool 39, illustrated by itself in side view in FIG. 4, consists of a plane-parallel sheet metal member of predetermined thickness $s$ which forms both the plier handle 42 and also the one clamping jaw 43. The one outer surface 44 of the plier handle is completely plane and constructed without any projections and can therefore be placed in any desired position on the retaining magnet 41 and/or can be displaced thereon. The other surface 45 of the sheet metal member 42 is — as already stated — parallel to the magnet surface 44 of the holding tool 39 and forms the receiving and supporting surface of the object holding tool determining the clamped position of the object 46 (FIG. 3). The flat object 46 of a thickness $d$ is pressed onto the object-receiving and supporting surface 45 by the riveted-on spring tongue 47 and is thus fixed in the intended position. The already mentioned spacing $a$ of the clamping surface of the retaining magnet 41 from the symmetry plane 32' is so selected that the object 46 inserted into the mouth of the plier-like holding tool 39 is retained symmetrically to the plane 32'. It is necessary for that purpose that the distance $a$ is equal to the sheet metal thickness $s$ of the body of the tool 39 plus one half the thickness $d$ of the object.

Owing to the magnetic retention of the plier-like object holding tool 39, the latter can be rapidly removed from the object support or carrier 19, the specimen can be accurately clamped into the tool mouth accurately as regards its position and the plier-like tool together with the specimen can also be mounted at the object support or carrier 19 accurately as regards position. The plier-like object holding tool 39 can thereby be so displaced or rotated in the plane of symmetry 32' that the desired position of the object reaches the center of the path of the beam. With changes in the distance and/or angle of the mirrors 9 and 10 or of the frame-like enclosures 9' and 10' thereof, the object carrier 19 is displaced by the transmission 18 in such a manner relative to the mirrors that in the changed relative position, the position of the symmetry plane is also the center plane or the bisecting plane of the mirrors.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. An optical isochromatic multiplier examination apparatus comprising:
    an object receiving chamber having two at least partially transmissive mirrors arranged in parallel and separated along an optical axis, said mirrors being adjustable with respect to their separation and their angle with said optical axis, said object receiving chamber containing fluid of a predetermined index of refraction, and
    carrier means mounted at said object receiving chamber for adjustably supporting an object to be examined in said fluid between said mirrors, said carrier means being adjustable to maintain alignment of said object centrally between said mirrors, and said carrier means including support surface means for positioning said object in a plane parallel with said mirrors and fastening means for securing said object to said support surface means.

2. An apparatus according to claim 1, wherein said carrier means include driving means for moving said support surface means and said object in correspondence to angular and separational adjustments of said mirrors such that said object is maintained centrally between said mirrors.

3. An apparatus according to claim 2, wherein said driving means includes motion translation means for moving said support surface means in bisecting relationship to the separation and angle of said mirrors.

4. An apparatus according to claim 3, wherein said motion translation means includes a kinematic planar linkage system having seven linkage members and six pivotal joints for said linkage members, said linkage system being symmetrical with respect to two perpendicularly intersecting lines of symmetry in the plane of operation of said planar linkage system,
    wherein two first joints of said pivotal joints are separated along a first of said two lines of symmetry with three linkage members on each side of said first line of symmetry interconnecting said two first joints through a pair of second joints on each side of said first line of symmetry,
    said pair of second joints on each side of first line of symmetry being operatively attached to said object receiving chamber with the pivotal axis of each of said second joints being parallel to said mirrors, and said pair of second joints on each side of said first line of symmetry being separated from one another at a predetermined spacing which is the same on each side of said first line of symmetry,
    wherein a seventh of said seven linkage members extends between said two first joints, said seventh linkage member being only pivotal at one of said first joints, and being pivotal and slidable along a linear guide in said first line of symmetry at the other of said two first joints, and
    wherein said support surface means, together with said fastening means, is operatively connected to said seventh linkage member to arrange said support surface means in parallel with said first line of symmetry for positioning said object along said first line of symmetry.

5. An apparatus according to claim 4, wherein said support surface means and said fastening means are detachably connected to said seventh linkage member.

6. An apparatus according to claim 5, wherein magnetic means, including a magnet and a ferromagnetic counter-surface at the respective seventh linkage member and support surface means, provide a rapidly detachable connection therebetween.

7. An apparatus according to claim 6, wherein said support surface means include a plane sheet metal member, and said fastening means includes an elastic spring member attached at one end to said sheet metal member and extending in parallel to said sheet metal member.

8. An apparatus according to claim 7, wherein said spring member forms a movable jaw of a clamping structure, and said sheet metal member forms an immovable jaw of said clamping structure.

9. An apparatus according to claim 8, wherein said spring member is of a spring steel material.

10. An apparatus according to claim 8, wherein said sheet metal member provides said ferromagnetic counter-surface, and said magnet is supported on said seventh linkage member.

11. An apparatus according to claim 10, wherein said magnet is disposed at the intersection of said two lines of symmetry.

12. An apparatus according to claim 10, wherein said magnet has a flat surface in contact with said ferromagnetic counter-surface and in parallel with said first line of symmetry, said flat surface being spaced from said first line of symmetry by a distance equal to one-half the thickness of said object plus the thickness of said sheet metal member.

13. An apparatus according to claim 1, wherein said support surface means include a plane sheet metal member, and said fastening means includes an elastic spring member attached at one end to said sheet metal member and extending in parallel to said sheet metal member.

14. An apparatus according to claim 13, wherein said spring member forms a movable jaw of a clamping structure, and said sheet metal member forms an immovable jaw of said clamping structure.

15. An apparatus according to claim 14, wherein said spring member is of a spring steel material.

16. An apparatus according to claim 2, wherein said support surface means and said fastening means are detachably connected to said driving means.

17. An apparatus according to claim 2, wherein magnetic means, including a magnet and a ferromagnetic counter-surface at a respective one of said driving means and said support surface means, provide a rapidly detachable connection therebetween.

18. An apparatus according to claim 2, wherein said support surface means include a plane sheet metal member, and said fastening means includes an elastic spring member attached at one end to said sheet metal member and extending in parallel to said sheet metal member.

19. An apparatus according to claim 18, wherein said spring member forms a movable jaw of a clamping structure, and said sheet metal member forms an immovable jaw of said clamping structure.

20. An apparatus according to claim 19, wherein said spring member is of a spring steel material.

21. An apparatus according to claim 3, wherein said support surface means and said fastening means are detachably connected to said motion translation means.

22. An apparatus according to claim 3, wherein magnetic means, including a magnet and a ferromagnetic counter-surface at a respective one of said motion translation means and said support surface means, provide a rapidly detachable connection therebetween.

23. An apparatus according to claim 3, wherein said support surface means include a plane sheet metal member, and said fastening means includes an elastic spring member attached at one end to said sheet metal member and extending in parallel to said sheet metal member.

24. An apparatus according to claim 23, wherein said spring member forms a movable jaw of a clamping structure, and said sheet metal member forms an immovable jaw of said clamping structure.

25. An apparatus according to claim 24, wherein said spring member is of a spring steel material.

26. An apparatus according to claim 1, wherein said predetermined index of refraction of said fluid is substantially the same as the index of refraction of said object.

27. An apparatus according to claim 1, wherein said object is a flat, planar transparent member.

28. An apparatus according to claim 1, further including means for applying polarized light along said optical axis to said object, and means disposed on said optical axis for analyzing polarized light passing through said object, wherein said mirrors are mutually adjustable to be at predetermined angles with respect to said optical axis.

* * * * *